United States Patent [19]
Welker et al.

[11] Patent Number: 6,076,139
[45] Date of Patent: Jun. 13, 2000

[54] MULTIMEDIA COMPUTER ARCHITECTURE WITH MULTI-CHANNEL CONCURRENT MEMORY ACCESS

[75] Inventors: Mark W. Welker, Spring; Thomas J. Bonola, Tomball; Michael P. Moriarty, Spring, all of Tex.

[73] Assignee: Compaq Computer Corporation, Houston, Tex.

[21] Appl. No.: 08/940,914

[22] Filed: Sep. 30, 1997

Related U.S. Application Data

[63] Continuation-in-part of application No. 08/777,781, Dec. 31, 1996.

[51] Int. Cl.[7] .................................................. G06F 13/16
[52] U.S. Cl. ............................ 711/104; 711/146; 710/128
[58] Field of Search ........................... 710/128; 345/197; 711/104, 118, 146

[56] References Cited

U.S. PATENT DOCUMENTS

| | | | |
|---|---|---|---|
| 5,050,066 | 9/1991 | Meyers et al. ........................... | 364/200 |
| 5,208,745 | 5/1993 | Quentin et al. .......................... | 364/188 |
| 5,335,321 | 8/1994 | Harney et al. ........................... | 395/162 |
| 5,434,592 | 7/1995 | Dinwiddie, Jr. et al. ................ | 345/133 |
| 5,448,558 | 9/1995 | Gildea et al. ............................. | 370/60 |
| 5,572,701 | 11/1996 | Ishida et al. ............................ | 711/146 |
| 5,640,332 | 6/1997 | Baker et al. ............................. | 345/197 |
| 5,640,543 | 6/1997 | Farrell et al. ............................ | 395/502 |
| 5,664,223 | 9/1997 | Bender et al. ........................... | 395/842 |
| 5,687,316 | 11/1997 | Graziano et al. ....................... | 395/200.2 |
| 5,708,779 | 1/1998 | Graziano et al. ....................... | 395/200.8 |
| 5,771,359 | 6/1998 | Galloway et al. ....................... | 710/128 |

OTHER PUBLICATIONS

Video Electronics Standards Association, VESA®, VUMA Standare—Hardware Specifications, Version 1.0, ©Copyright 1995, Revision Date: Mar. 8, 1996, pp. 1–46.

Video Electronics Standards Association, VESA®, VM Channel™ Standard, Version 1.0, © Copyright 1995, Revision Date: Dec. 1, 1993, pp. 1–81.

*Primary Examiner*—John W. Cabeca
*Assistant Examiner*—Christopher S. Chow
*Attorney, Agent, or Firm*—Akin, Gump, Strauss, Hauer & Feld, LLP

[57] ABSTRACT

A computer system providing multiple processors or masters an architecture for highly concurrent processing and data throughput. A multiple channel memory architecture provides concurrent access to memory. Arbitration and snoop logic controls access to each memory channel and maintains cache coherency. A host CPU, multimedia processor, pipes processor and display controller may independently and concurrently access memory. The pipes processor provides a decoupled input/output processor for universal serial bus and firewire serial buses to free up the host CPU.

14 Claims, 5 Drawing Sheets

MULTIMEDIA COMPUTER ARCHITECTURE WITH MULTI-CHANNEL CONCURRENT MEMORY ACCESS

RELATED APPLICATIONS

This application is a continuation-in-part of Ser. No. 08/777,781, filed Dec. 31, 1996, now pending which is hereby incorporated by reference.

BACKGROUND OF THE INVENTION

1. Field of the Invention

The invention relates to a computer architecture particularly adapted for high bandwidth, high concurrency and multitasking operations.

2. Description of the Related Art

Computer systems are being developed with more powerful and advanced features with each passing moment. Many new advanced bus structures such as the PCI, or Peripheral Component Interconnect, bus have been developed to allow greater performance of the computer system. Additionally, new communications buses such as Universal Serial Bus and I.E.E.E. 1394 (Institute of Electrical and Electronic Engineers) a.k.a. Firewire, have been developed as the modem personal computer is becoming a much more connected and multimedia oriented system.

However, certain functions such as graphics and video are being required to manipulate ever increasing amounts of data. High resolution screens, such as 1280×1024, and true-color modes, such as 16 million colors, require large frame buffers to store data representing screen pixels. Conventionally, the computer system maintains two frame buffers: one in main memory which the processor writes to; and one in the display subsystem for the temporary storage of data as it is moved from main memory to the screen. This duplication and the frame buffer size causes the memory requirements to be not insignificant.

To address some of these concerns, and to lower overall system cost, it has been proposed that a unified memory architecture (UMA) be developed in which the display frame buffer not be separate, but be integral with system memory. Thus, the step of moving the data from system memory to graphics memory is eliminated at the expense of more memory accesses. Although this solution succeeds in lower costs, it is not preferable since it decreases overall system performance.

A further complication develops if 3-dimensional (3D) or virtual reality features are to be performed because data must first be heavily manipulated. Thus, in addition to the memory requirements discussed above, further processing and data movement is required. Thus, system memory soon becomes a bottleneck for the computer system. Full screen video requires this data to be supplied to the display at a rate of at least 30 frames per second. These specifications singly cause most of the bandwidth of the PCI bus to be exhausted.

SUMMARY OF THE INVENTION

The present disclosure relates to a computer architecture providing multiple access channels to memory. A number of processors or masters, including a host CPU, are capable of directly accessing memory. Each master may access memory through any memory channel. Each channel may be accessed simultaneously by different masters for highly concurrent memory access.

Each memory channel includes an arbiter to determine which master has priority. A snoop controller in each memory channel is provided to maintain the host CPU caches coherent with memory. A central snoop arbiter receives individual snoop requests from each memory channel to determine snoop cycle priority back to the host CPU caches.

The memory is preferably comprised of dynamic random access memory devices capable of having multiple rows or pages open at a time. Accesses to pages not open are preceded by an open transaction to the memory device. Each memory channel includes dual data buffers so that memory access cycles to opened pages can be interleaved between memory access cycles to closed pages.

Each channel includes a page-hit detector/controller to monitor memory accesses and control the transmission or receipt of data to/from the data buffers.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
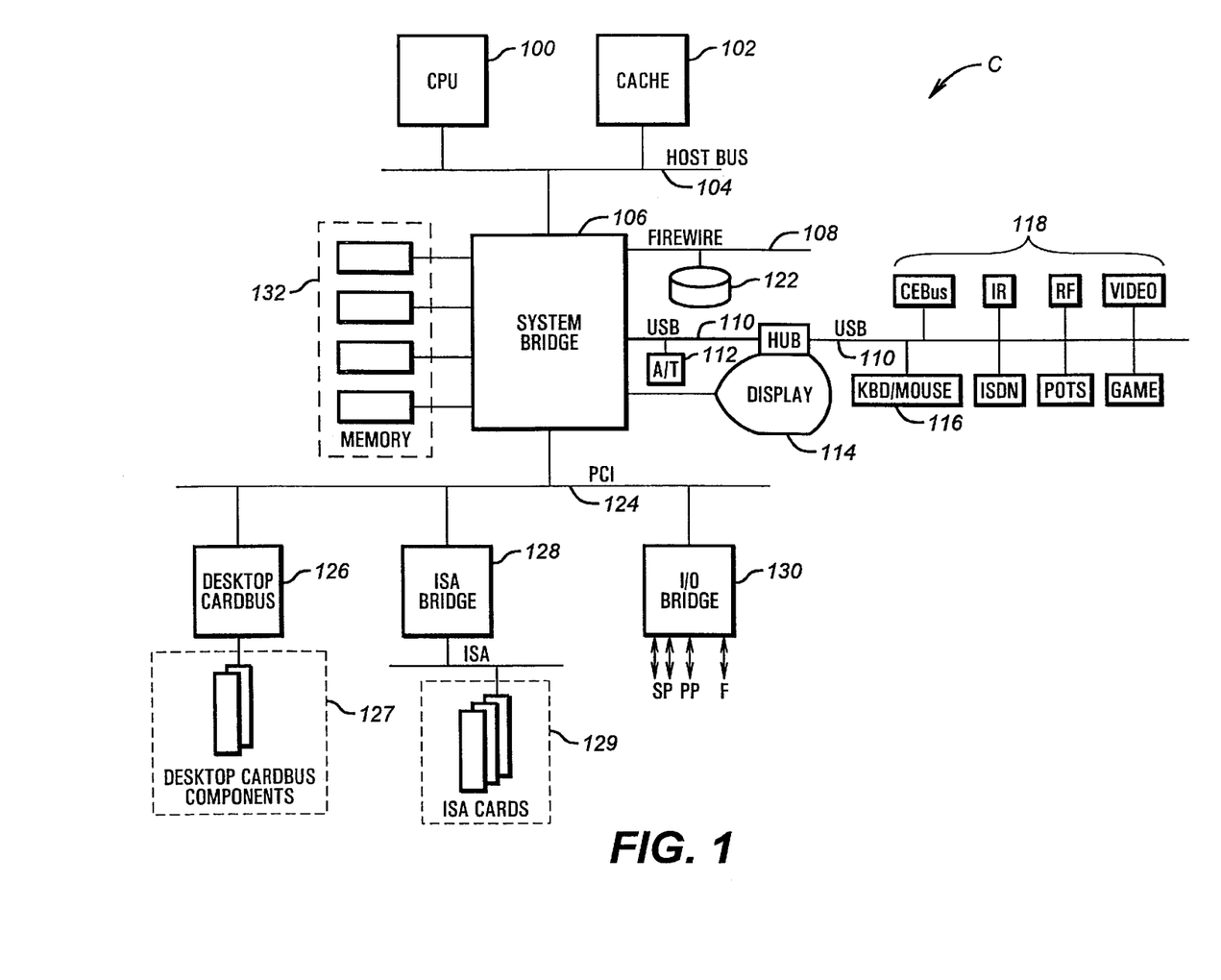
FIG. 1 is a block diagram illustrating a computer system C according to the preferred embodiment of the present invention.

Referring now to FIG. 1, the computer system C according to the preferred embodiment is generally shown. The computer system C includes a processor 100 such as a Pentium® by Intel or its equivalents. It is understood that other processors, such as a Pentium Pro® could of course be utilized. The processor 100 is coupled to a level two (L2) cache 102 and a system bridge 106 by a host bus 104. Alternatively, the cache may have its own dedicated bus off the processor 100, such as with a Pentium Pro processor. The system bridge 106 interfaces the processor 100 to the remaining computer system C and provides among other functions, a high speed multimedia processor (MMP). Although only one processor 100 is shown, the principles of the present invention are easily extended to a multi-processor system.

The system bridge 106 provides specialized control logic for supporting a universal serial bus (USB) 110 and an I.E.E.E. 1394 compliant firewire bus 108. These buses are standard serial buses for communicating with multiple components as defined in their respective specifications, hereby incorporated by reference. The USB 110 is coupled to an audio/telephone (POTS) component 112 and a monitor or display 114. The monitor 114 also acts as a USB hub for further serial bus devices, such as a keyboard/mouse 116 and other optional devices 118, including an ISDN (integrated services digital network) telephone line, POTS (plain old telephone system), game port, CEBus (Consumer Electronic Bus), infrared (IR) interface, radio frequency (RF) interface and video. It is understood that for the monitor 114, data is transmitted via a video/graphics connection 120. The firewire bus 108 provides a standard communications bus for devices requiring a higher bandwidth than USB devices, such as a disk drive or mass storage device 122 and video electronics (not shown).

The system bridge 106 also supports a peripheral component interface (PCI) bus 124. More detail on the PCI bus can be found in the PCI Specification, version 2.1 available from the PCI Special Interest Group of Intel Corporation, which is hereby incorporated by reference. The PCI bus 124 provides standard parallel bus connectivity for standard PCI cards and is used herein to also couple to a desktop card bus expansion bridge 126 and a input/output bridge 130. The input/output bridge 130 provides support for conventional I/O such as a parallel port, floppy controller and serial port(s). The card bus expansion bridge 126 provides an interface for at least two desktop card bus components 127. Optionally, an ISA (Industry Standard Architecture) bridge 128 to support ISA cards 129 can be provided.

The system bridge 106 also includes a memory controller and interface logic for communicating with system memory 132 as described below. Memory 132 is divided into a number of independent channels as described below.

Figure 2:
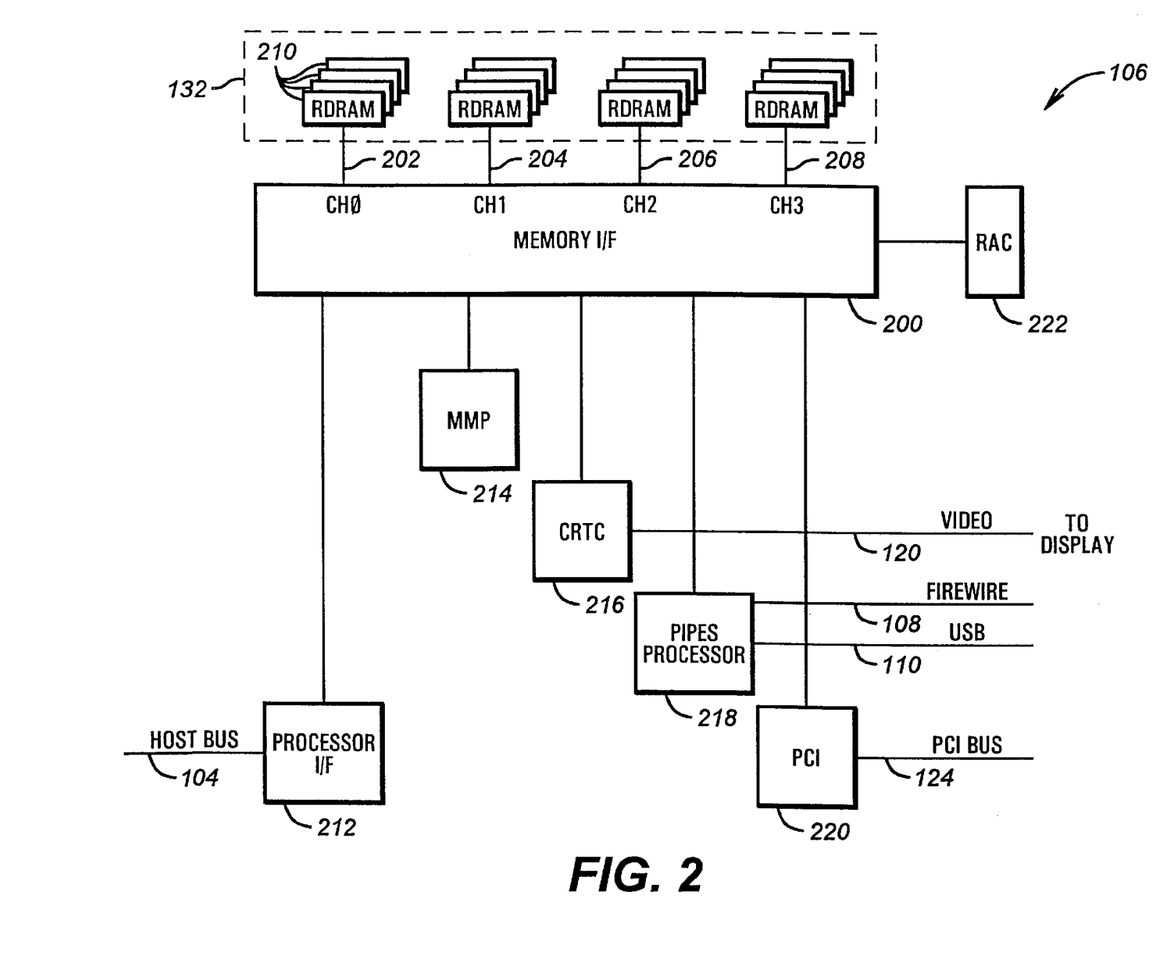
FIG. 2 is a block diagram illustrating the system bridge of the computer system C according to the preferred embodiment.

Now referring to FIG. 2, there is illustrated a more detailed block diagram of the system bridge 106. Included in the system bridge 106 is a multi-channel memory interface 200 which provides multiple Rambus™ or memory channels 202–208. Each Rambus channel couples to a number of RDRAMs 210 (Rambus dynamic random access memory). The Rambus channel is a synchronous, high speed bus that is used to directly connect RDRAMs to master devices, such as the processor 100. The Rambus channel is presently eight/nine bits wide and capable of transferring data at rates up to 500 Mbytes per second from a single RDRAM 210. Multiple channels provide concurrent access to memory 132. More details on RDRAMs and Rambus technology are found in the Architectural Overview, and other literature, from RAMBUS, Inc, hereby incorporated by reference.

Each RDRAM 210 is composed of four independent banks of memory, each bank storing ¼ of the total capacity of the RDRAM 210. Each of these banks has an open row, or page, associated with it. For example, a 64 Mbyte RDRAM in a 8M×8 configuration has four banks of 2 Mbyte each, each bank having a 2 Kbyte page. This allows low latency column (CAS) accesses to be made to the same page of RDRAM 210, and multiple low latency accesses across the entire memory 132. Further performance gains are contemplated by interleaving the memory channels.

A number of master devices are coupled to the memory interface 200, including a processor interface block 212, a multimedia processor (MMP) 214, a display controller (CRTC) 216, a pipes processor 218 and a PCI controller 220. The master devices communicate with the processor 100 via a command packet protocol. More detail is provided on the command packet protocol in U.S. patent application Ser. No. 08/940,911 now U.S. Pat. No. 5,968,858, by Thomas J. Bonola, Michael P. Moriarty, and Michael P. Medina, entitled PACKET PROTOCOL AND DISTRIBUTED BURST ENGINE, filed concurrently herewith and hereby incorporated by reference.

Each master 212–220 is capable of accessing memory 132 through any of the four channels 202–208. Each master provides two types of requests to access memory: read requests and write requests. The processor I/F 212 is also capable of accessing each of the other masters through the memory interface 200. Thus, the memory interface 200 acts like a crossbar switch. In the operation of the computer system C, memory 132 is divided into logical partitions which are then physically allocated across the channels, so that multiple concurrent accesses are possible. Configuration registers define a memory range for each channel.

The multimedia processor 214 is a high performance digital signal processing engine, preferably an Mpact processor, or its equivalent, from Chromatic Research. Details on the Mpact media engine are found in the Mpact databook, and other literature, from Chromatic Research hereby incorporated by reference. The MMP 214 is optimized for video, graphics, audio and communications processing. The CRTC 216 is a video/graphics controller designed to cooperate with the MMP 214. Graphics and video pixel processing are handled by the MMP 214. The CRTC 216 includes the remaining components of a video/graphics subsystem; such as, a memory sequencer, CRT controller, attribute controller, dual frequency synthesizer and a color palette DAC (digital/analog converter) (all not shown). The CRTC 216 is configurable to produce standard VGA (video graphic array) output; analog RGB (red, green and blue) output; TFT (thin film transistor) output; NTSC (National television system committee), a color encoding scheme used for television input/output; and VMI (video memory interface) video output.

The pipes processor 218 provides a single memory access point for both the firewire 108 and USB 110 buses. The memory I/F 200 may optionally couple to a Rambus interface 222 which may be used as a general purpose internal communications bus to other optional components. Now referring to FIG. 3, there is illustrated a more detailed block diagram of the memory interface 200. Five interface control blocks 300–308 are each connected to four memory interface control blocks (MIC) 310. Any of the interface control blocks 300–308 may run a memory cycle from their respective master to any one of the four memory channels 202–208. Each memory channel is independent of the other, thus, four memory cycles may be performed concurrently. In addition to connecting to each memory channel 202–208, a processor interface control block (PIC) 300 is connected to a multimedia processor interface control block (MMPIC) 302, a display interface control block (CRTCIC) 304, a pipes processor interface control block (PIPEIC) 306, and a PCI bus interface control block (PCIIC) 308.

Figure 3:
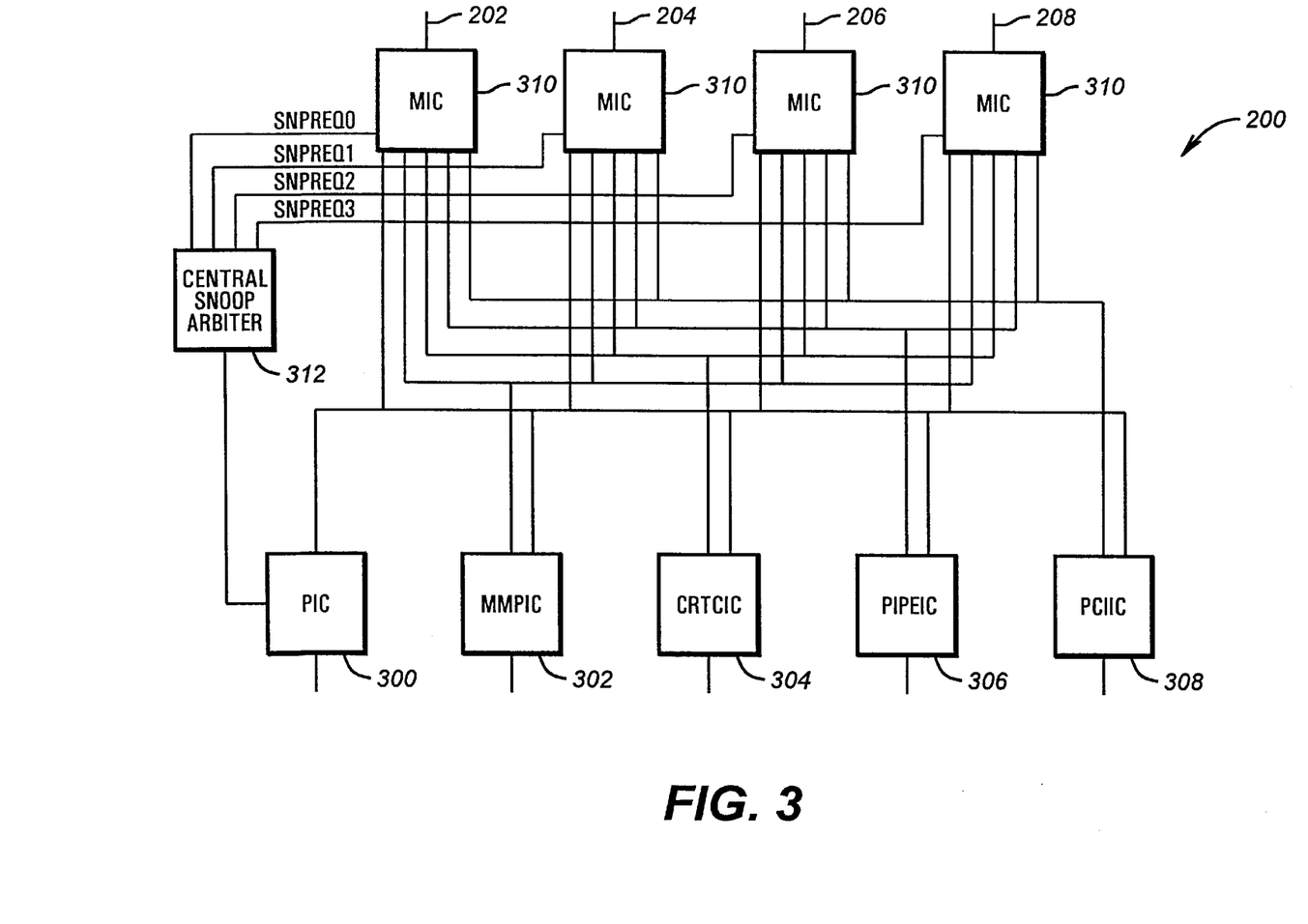
FIG. 3 is a block diagram illustrating the memory interface of the system bridge according to the preferred embodiment.

Each MIC 310 provides snoop cycles back to the processor 100 through the PIC 300 and processor interface 212. A central snoop arbiter 312 receives snoop requests from each MIC 310 for determining priority according to an arbitration scheme, such as a first in first out.

Each of the interface control blocks 300–308 contain a memory map for generating memory access requests to the appropriate channel 202–208. Memory ranges belonging to the channels 202–208, PCI 124, MMP 214, USB 110, Firewire 108, and CRTC 216 are defined in configuration registers. To optimize system performance, configuration registers defining cacheability, write-thru only, and non-cacheable ranges are also provided. Preferably, only the memory 132 is cacheable. The buses connecting the interface control blocks are preferably the full data width of the processor 100, and include address and control so that each master may individually communicate with memory 132 and not be limited by slower masters.

Figure 4:
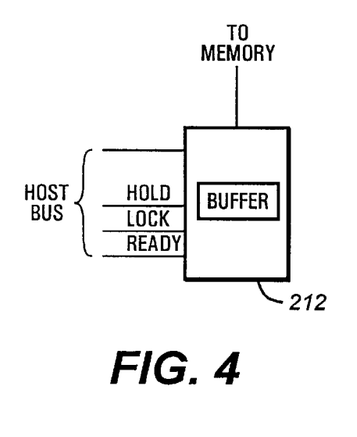
FIG. 4 is a block diagram illustrating the processor interface according to the preferred embodiment.

Now referring to FIG. 4, there is illustrated a more detailed block diagram of the processor interface 212. The processor interface 212 controls the processor interface of the system bridge 106 and the L2 cache 102 for Pentium systems. The processor interface 212 accepts cycles from the processor 100 and parses them out to the appropriate memory interface control block 310. In addition to memory 132, the processor 100 can also communicate directly with other masters 214–220 through the memory interface 200. Processor interface 212 decodes all memory, input/output (I/O), configuration, interrupt acknowledge, etc., cycles from the processor 100. The MMP 214, CRTC 216, pipes processor 218 and PCI I/F 220 are slaves when being accessed by processor 100, but masters when accessing memory 132 for themselves.

The processor 100 may run a memory cycle on any of the four memory channels 202–208. Each memory channel has a unique address range and a write data buffer 708 (FIG. 6) four Dwords deep to accommodate a cache writeback cycle or burst cycle. Writes between channels but originating from the processor 100 may be completed out of order since all processor writes have highest priority compared to the other masters 214–220, and therefore, are completed first (except for CRTC 216 and its frame buffer space). For example, if the processor 100 writes data to channel 1 and then writes data to channel 2, the write cycle to channel 2 may complete before channel 1. Hence, this does not cause a coherency problem since no other master can read or write from channel 1 until the processor 100 write to channel 1 has completed. The processor 100 stays coherent since it does not read around its own write posting buffer.

Any memory channel 202–208 may be locked down with a locked cycle. Processor 100 memory lock cycles to memory 132 locks down only the channel being accessed. The remaining three channels are unaffected. The memory channel 202–208 locked by the processor 100, however, can only be accessed by the processor 100. While a channel is locked, masters 212–220 may post data into their write data buffer 708, but the write data buffer only clears when the processor 100 RMW (read-modify-write) cycle has completed and the processor interface 212 releases the lock. All masters 212–220 attempting to read from the locked memory channel 202–208 are backed off until the lock is released by the processor interface 212. The write posting buffer 708 is not required to empty before the processor 100 locks the memory channel 202–208.

Only one master 212–220 is allowed to lock memory at a time. For example, if PCI controller 220 tries to lock channel 3 in memory 132, but the processor 100 currently has channel 1 locked, the PCI lock cycle is held back until the processor lock to channel 1 is released to prevent a deadlock condition.

If another master 212–220 attempts to lock memory 132, the write data buffer 708 to that memory channel 202–208 is emptied first. All further cycles from the processor 100 to the locked memory channel 202–208 are not allowed and the processor 100 is placed in hold if it tries to access the locked channel. The processor 100 is taken out of hold when the channel is unlocked and the locking master's posted write buffer emptied. All other masters are allowed to post into the write data buffer 708, but the channel only clears when the locking master releases lock and empties the write posting buffer. All masters 212–220 attempting to read from the locked memory channel 202–208 are backed off until lock is released by the processor interface 212. Write posting buffers 708 (except for the processor's 100 and the locking master's 214–220) are not required to empty before the processor 100 locks a memory channel 202–208.

The processor 100 may perform reads or writes to another master 214–220 for I/O and configuration cycles. To avoid data incoherency, the processor interface 212 does not return ready to the processor 100 on a master read cycle until all posted writes from the same master to memory 132 are written. If the master 214–220 is writing a long chain of data to memory 132, the processor interface 212 waits for the processor 100 to receive its data, and then control blocks 300–308 block the master from posting to memory 132 until the write posting buffer 708 is cleared and a ready is presented to the processor 100. After the processor 100 drops its block the master can resume writing to memory 132 and its write posting buffer 708. If a processor memory read cycle is pipelined onto a processor 100 read of another master 214–220, the processor interface 212 blocks the processor read cycle until any master read cycles have completed and the same master's write data buffer 708 is clear.

The processor 100 may also perform writes and posted writes to another master 214–220. However, the processor interface 212 prevents the processor 100 from performing posted writes by holding ready until the write actually completes, if that master is currently reading from memory 132.

Figure 5:
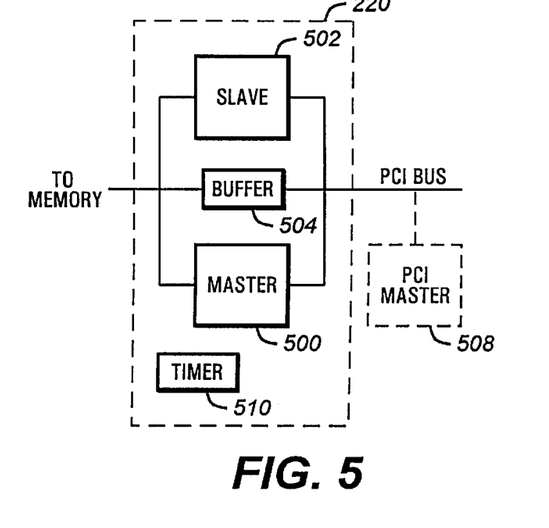
FIG. 5 is a block diagram illustrating the PCI interface according to the preferred embodiment.

Now referring to FIG. 5, there is illustrated a more detailed block diagram of the PCI interface block 220. The PCI interface 220 provides the necessary bus master/slave control logic for the PCI interface 220 to act as both a master and slave on the PCI bus 124. It has two basic control areas, PCI master 500 and PCI slave 502. The PCI interface 220 communicates with the processor interface 212 for processor accesses to the PCI bus 124 and with the memory interface 200 for PCI accesses to RDRAM 210. The PCI master 500 interfaces with the PCI bus 124 and the PCI slave block 502 with MIC 310.

The PCI master block 500 controls and monitors the PCI bus 124 for all processor, memory, I/O, interrupt acknowledge, or configuration cycles to the PCI bus 124. All memory write cycles are preferably bursted. Memory read (except for atomic), I/O, interrupt acknowledge, and configuration cycles are performed without burst cycles. Memory writes from the processor 100 are marked either as posted (ready sent to the processor) or non-posted (ready not generated until completed on PCI). All other processor cycles are marked as non-posted.

All write cycles to the PCI bus 124 are posted in a write buffer 504 and treated in FIFO fashion. If the processor 100 posts a memory write to the PCI bus 124, and a PCI bus master 508 requests read data from memory 132, the PCI bus master 508 is forced to retry its read cycle until the posted write from the processor 100 has successfully completed on the PCI bus 124. A retry timing register 510 is provided to guarantee PCI masters are not starved from memory 132. The timing register 510 prevents the processor 100 from posting further writes, so that the write posting buffer 504 may clear and the PCI bus master 508 may gain access to memory 132. If the PCI bus master 508 is in the middle of a memory 132 read, and the processor 100 wants to do a memory write on the PCI bus 124, the processor 100 marks and treats his write as non-posted. Thus, both cases guarantee memory coherency since read and write cycles between masters remain in order.

The PCI slave block 502 controls all memory cycles from the PCI bus 124 trying to access memory 132. All memory write cycles are allowed to burst until the write posting buffer 708 to memory 132 is filled. All PCI bus masters 508 trying to write to memory 132 while the posting buffer 708 is full are retried by the PCI slave block 502. Write requests to memory 132 are conveniently limited to a cache line for snooping/write-back purposes.

For read cycles, the PCI slave block 502 requests data from memory 132 and fills the write posting buffer 708 after all posted writes are first written to memory 132. The amount of data requested may be limited to the type of read command generated on the PCI bus 124 (read, line read, or multiple line read) but preferably is not greater than the write posting buffer size. Read burst lengths are conveniently limited to the size of a RDRAM 210 page size.

Figure 6:
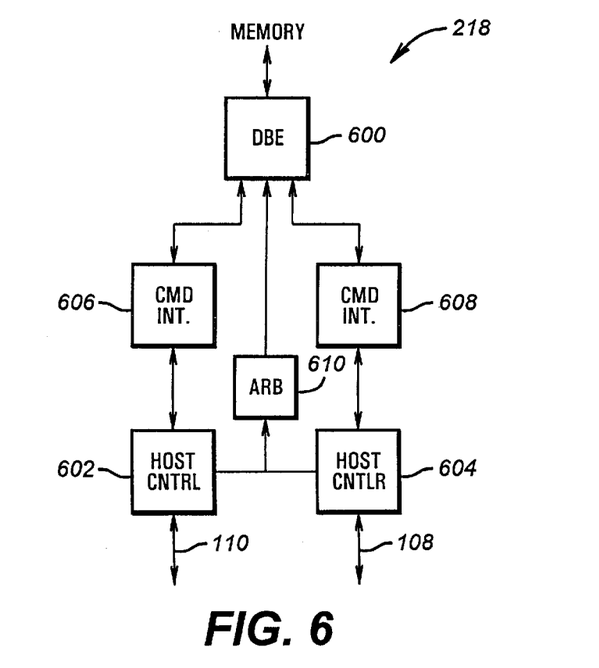
FIG. 6 is a block diagram illustrating the pipes processor according to the preferred embodiment.

Now referring to FIG. 6, there is illustrated a more detailed block diagram of the pipes processor 218. A distributed burst engine (DBE) 600 provides a single interface to memory 132 for a USB host controller 602 and a firewire host controller 604. Data is received and transmitted by the DBE 600 in the form of packets. More detail on the DBE 600 and packets can be found in the application filed concurrently herewith and incorporated by reference above. Command interpreters 606 and 608 encode/decode packets and provide data/command to the host controllers 602 and 604 to perform I/O operations.

An arbiter 610 receives requests from both host controllers 602 and 604 and determines priority to avoid stalling either serial bus.

Figure 7:
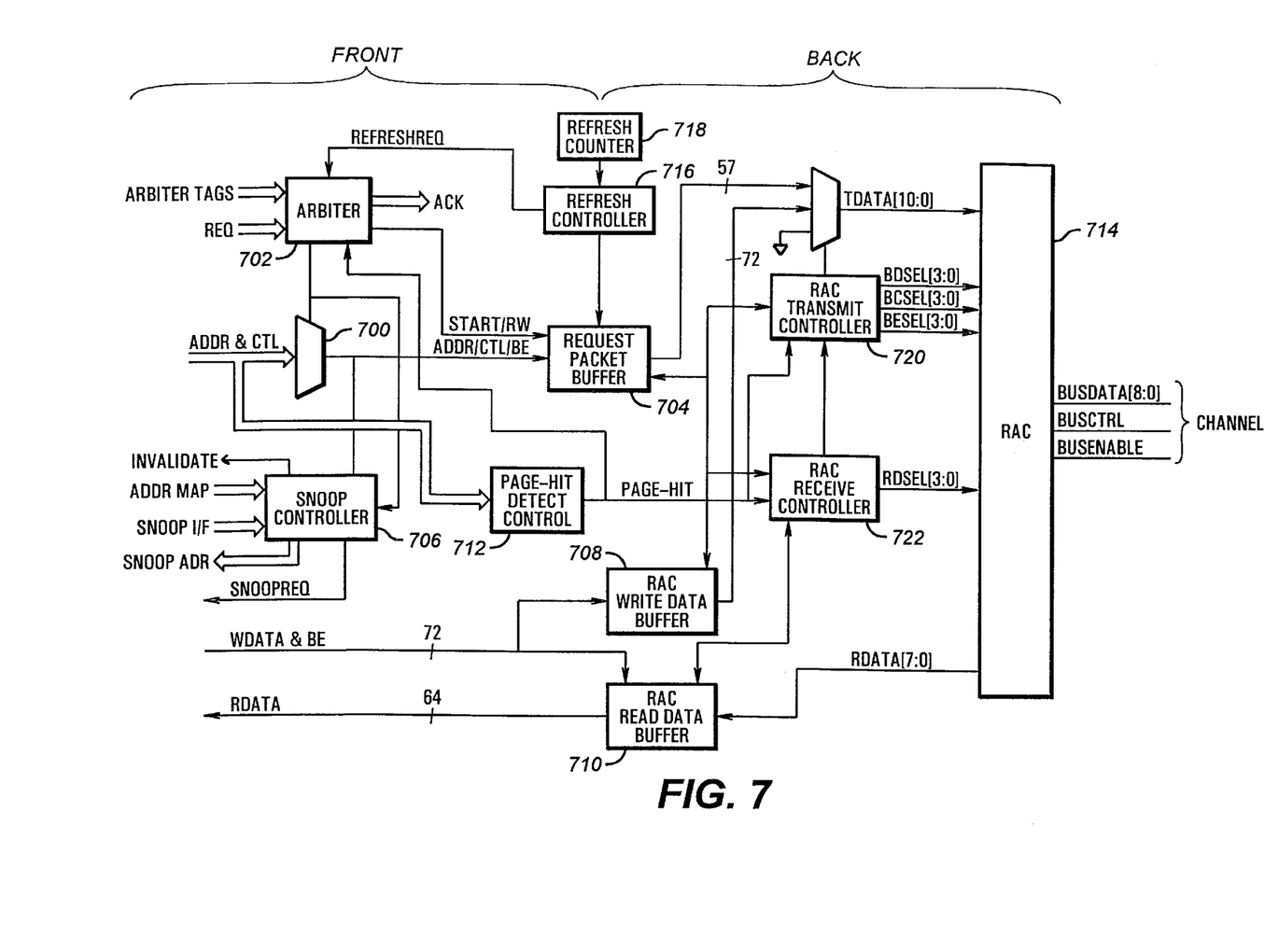
FIG. 7 is a block diagram illustrating the memory interface control block according to the preferred embodiment.

Now referring to FIG. 7, there is illustrated a more detailed block diagram of the MIC 310. Each MIC 310 independently controls access to its respective memory channel 202–208. The MIC 310 includes a front portion and back portion. The front portion interfaces to the multiple masters 212–220 through a single bus 314. The back portion includes a Rambus ASIC (application specific integrated circuit) cell (RAC) 714 for interfacing to the RDRAMs 210. More information on the Rambus ASIC can be obtained from the Rambus ASIC Cell Specification, version 5.7.1, published by Rambus, Inc, and hereby incorporated by reference.

Each MIC 310 contains an arbiter 702, snoop controller 706, page-hit detection/control 712, refresh controller 716 and timer/counter 718.

Each MIC 310 is coupled to the bus masters 212–220 through a single address, data and control bus 314. Each bus master 212–220 indicates the type of address space it is accessing: writeback, write-thru, or non-cacheable. Write data is received into a dual cache line write data buffer 708 and read data is provided to the masters from a dual cache line read data buffer 710. The read data buffer 710 is one cache line deep. Thus, if each master 212–220 requesting more than one cache line is not capable of keeping up with the MIC 310, the read data buffer 710 will overrun.

Data is communicated between the RDRAMs 210 and the masters 212–220 by a transaction protocol according to the Rambus channel. A transaction consists of the channel activity which transfers a block of data to or from the RDRAMs 210. A transaction is composed of five packet types: request, serial address, serial control, serial mode, and data. A request packet buffer 704 assembles address and control information from the masters into a six-byte request packet that the RDRAMs 210 understand. Concurrent transactions may be used to a single RDRAM 210 to optimize RDRAM utilization.

Once a cycle is arbitrated, its address is latched into the request packet buffer 704 and data is latched into the write data buffer, if a write cycle, and both are passed on to the back portion of the MIC. The back portion generates a request packet, RDRAM 210 timing, page-hit information, and number of data packets communicated to/from the master 212–220. Preferably the number of packets is limited to a cache line if the address is within write-back or write-thru address space and for all write cycles. Preferably packet size is memory page aligned and limited to 2 Kbytes in size for reads to non-cacheable address space.

The page-hit detection logic 712 tracks the open pages of the RDRAMs 210 to determine page hits/misses. The request packet buffer 704, write data buffer 708 and read data buffer 710 are conveniently dual cache line buffers to facilitate effective use of interleaved transactions. If an operation from one of the masters is directed to a RDRAM page not yet opened, a memory access to an opened page can be interleaved by using the alternate buffer.

The arbiter 702 receives access requests from each master and provides a grant or acknowledge to a master with highest priority. Priority can be determined according to a least recently used, first-in-first-out or round-robin fashion. However, high bandwidth devices, such as the MMP 214, can be assigned highest priority to a particular channel according to arbiter tags. For example, the processor 100 can be assigned highest priority on channel 0 202, while the MMP 214 can be assigned highest priority on channel 3 208. Each master can access any channel, but access to its high priority channel will be, on average, much faster than access to other channels. Generally, this type of arbitration scheme is optimal where the memory channels are interleaved with large granularity. The tags dictate the priority of each request and are configurable via PCI configuration registers.

The arbiter 702 accepts both read and write requests. Except for processor 100 writes, any read request may take priority over all writes. However, a write request takes priority over a read when the write data buffer 708 is almost full and requires service.

The arbiter 702 provides an acknowledge (ACK) for each master. Each master ensures the write data buffer 708 is not starved from memory with many back to back read arounds so that the write data buffer 708 does not fill and slow master writes to memory 132.

For masters that do not implement read around writes, such as the PCI controller 220, the master generates both a read and write request to indicate to the arbiter 702 that the master is starved waiting for its write data buffer 708 to clear. In response, the arbiter increases priority of the write request with respect to the read request of the master requesting both.

Where the processor 100 is contending for the same channel with a master implementing read around writes, the arbiter 702 increases the priority for the master's write cycle and causes the master to cease posting writes. Even if data is available for the processor 100, the ready is held off to the processor 100 until the write data buffer 708 is cleared. After the write data buffer 708 is emptied, the ready is returned to the processor 100 and the master may then resume posting writes to memory 132.

Each MIC 310 has its own snoop controller 706 generating one snoop request at a time. One central snoop arbiter 312 balances and prioritizes the four snoop requests and forwards one to the PIC 300. The snoop controller 706 is tightly coupled to the arbiter 702.

Each memory access request from a master 212–220 includes the address, data (for writes), number of packets, and cache information. For cycles marked non-cacheable or read cycles to write-thru address space, the snoop controller does nothing. For write cycles marked write-thru, the snoop controller 706 generates a snoop request, cache-line address, and asserts invalidate. The MIC 310 runs the memory access cycle to completion and waits for a snoop acknowledge. The snoop acknowledge for write-thru addresses may mean the central snoop controller has latched the request and is waiting to run on the processor bus.

For cycles marked write-back it becomes slightly more complex. When a write cycle marked write-backable is encountered, the MIC 310 accepts the data from the master 212–220 and holds it within the write data buffer 708. If the write cycle is a full cache-line, the snoop controller 706 generates a snoop request, cache-line address, and asserts invalidate. The MIC 310 waits for the snoop acknowledge as described above. If the write cycle is not a full cache-line, the snoop controller 706 generates a snoop request and cache-line address but does not assert invalidate and waits for the snoop acknowledge. Snoop acknowledge indicates the snoop cycle has actually run on the processor bus. The MIC 310 does not run the memory cycle until snoop acknowledge is received.

If the snoop is a miss or a hit to an unmodified line, the snoop controller 706 simply generates snoop acknowledge and the memory write cycle is started. The unmodified line is then marked invalid.

If the snoop is a hit to a modified line, the snoop controller 706 generates snoop acknowledge and a dirty signal pre-empting the completion of the write cycle. The processor write-back cycle is allowed to run merging the cache data with the master data in the write data buffer 708. The memory write cycle is then generated and the modified cache-line is marked invalid.

When a read cycle marked write-backable is encountered, the MIC 310 runs the memory read cycle and holds the data within the read data buffer 710 waiting for the snoop acknowledge. The MIC 310 does not transfer the data to the master 212–220 until snoop acknowledge is received.

If the snoop is a miss or a hit to an unmodified line, it simply generates snoop acknowledge and the read data in the read data buffer is transferred to the requesting master 212–220. The cache requires no change of status.

If the snoop is a hit to a modified line, the master read cycle causing the snoop is preempted. The processor write-back cycle is allowed to run overwriting the data in the read data buffer 710 with the write-back data. The write-back data is also loaded into the write data buffer 708. A memory write cycle is then generated and the merged data in the read data buffer 710 is transferred to the requesting master 212–220. The modified cache line is marked unmodified.

The page-hit detector/controller 712 informs the back portion of the MIC 310 the timing of the memory cycle depending if its a page-hit, page-miss, or a precharge to the RDRAM 210. Configuration registers govern the memory timing, address mapping, and page size. The number of RDRAM pages allowed open is limited to eight per RDRAM channel, but could be more. The page-hit controller 712 is configured thru the PCI configuration address space.

The page-hit controller 712 portion decides when a RDRAM page should be left open or closed. For example, one channel may keep a page open after a processor code fetch while another channel closes the page after a similar fetch. With such a memory balancing architecture, the dynamic page-hit programming provides optimal performance from every memory channel.

A transmit controller 720 (RAC-T) and a receiver controller 722 (RAC-R) control the back portion of each MIC 310. The RAC-T 720 controls all transmitted signals on a Rambus channel 202–208. This includes the bus control BUSCTRL, bus data BUSDATA[8:0], and bus enable BUSENABLE signals. During write cycles, the RAC-T 720 transmits the request packet buffer first, then transmits write data via the BUSCTRL, BUSDATA[8:0], and BUSENABLE signals. The timing is determined by the RDRAM 210 module configured in the system and if the cycle is a page-hit, miss, or initialize. The RAC-T 720 controls the Bus signals thru three control busses: BDSEL[3:0] which controls the BUSDATA timing, BCSEL[3:0] which controls the BUSCTRL signal timing, and BESEL[3:0] which controls the BUSENABLE signal timing.

The RAC-T 720 always controls the BUSDATA bus during request phases and write cycles. It also controls the BUSCTRL and BUSENABLE signals for all other cycles since both are outputs to the RDRAM 210. For more information on the RAC 714 timing and signal definitions, refer to the Rambus documentation previously incorporated by reference.

The receive controller 722 (RAC-R) controls all incoming signals on the Rambus channels 202–208. This includes the BUSDATA[7:0] signals (BUSDATA[8] is preferably not included since parity is not desired). During read cycles, the RAC-R 722 receives and controls the buffering of the incoming read data. The timing is determined by the RDRAM 210 module configured in the system and if the cycle is a page-hit, miss, or initialize. The RAC-R 722 controls the BUSDATA timing thru the RDSEL[3:0] signals.

The RAC-R 722 always controls the BUSDATA[7:0] signals during read cycles. The BUSENABLE and BUSCTRL signals are controlled by the RAC-T 720 during read cycles. BUSDATA[8] is a don't care during reads. The RAC-R 722 is idle during request phases and all write cycles. For more information on the RAC 714 timing and signal definition, refer to the Rambus documentation previously incorporated by reference.

Each MIC 310 contains the refresh controller 716 which is responsible for tracking and requesting refresh cycles for the RDRAMs 210 connected to its channel 202–208. The refresh timing counter 718 is programmed via configuration registers in PCI configuration space. The refresh timing counter 718 decrements with every clock edge, and when it reaches zero, will request a refresh cycle.

The refresh request causes a broadcast refresh to all RDRAMs 210 connected to its channel 202–208. The request packet buffer 704 receives the refresh request and generates a request packet with a single octbyte (multiple eight-byte blocks) of data containing a broadcast memory write (WbnsB) command, an open field, a close field, and a byte enable mask field. Each RDRAM 210 receives the packet. The byte enable mask is set to all zeros so no data is written. The open field is set to a one to force a RAS access to the specified row of the specified bank of every RDRAM 210 and the close field is set to one to force a precharge after the refresh.

After the refresh cycle, the refresh timing counter 718 is reloaded, the bank/row address counter is incremented, and when the refresh timing counter 718 reaches zero, a refresh request is again generated.

To adequately refresh a 64 Mbit RDRAM 210, the refresh timing counter 718 generates a refresh request every 64 ms divided by 4 k pages, or every 15.625 $\mu$s. If 16 Mbit RDRAMs are used, a 64 Mbit page refresh will happen twice for every single 16 Mbit page refresh since the 64 Mbit page is twice as big. The refresh timing counter 718 is programmable to handle a variety of refresh rates.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A memory system for a computer system, the computer system having a processor and at least one bus master coupled to an input/output device, the processor having a cache, the memory system comprising:
a plurality of memory devices;
a memory controller coupled to said plurality of memory devices, including:
at least one bus interface, said bus interface for communicating data between said input/output device and said memory devices;
a processor interface for communicating data between said processor and said memory devices, including:
a central snoop arbiter for receiving snoop requests from a plurality of sources to snoop the processor cache, said central snoop arbiter determining priority among the snoop requests received and granting highest priority to one of the snoop requests; and
a memory interface, including:
a plurality of concurrently accessible memory channels, each memory channel communicating with a corresponding one of the plurality of memory devices, each memory channel corresponding to a unique address range, each memory channel being independently coupled to said processor interface and said at least one bus interface, each said memory channel including:
a snoop controller for generating a snoop request to the processor cache and receiving a snoop acknowledge; and
an arbiter receiving memory access requests from said processor and said at least one bus master.

2. The memory system of claim 1, wherein said memory system receives memory cycles from said processor and said at least one bus master, the memory system further comprising:
a memory mapper receiving said memory cycles for determining which memory channel the cycle should be directed to.

3. The memory system of claim 1, wherein each memory channel includes a write posting buffer, each write post buffer being independently completed.

4. The memory system of claim 1, wherein said arbiter is configurable to grant highest priority to a particular requester.

5. The memory system of claim 1, wherein said processor is capable of issuing lock cycles and wherein if said processor issues a locked cycle to one of said memory channels said one memory channel is locked and the remaining memory channels are not locked.

6. The memory system of claim 1, wherein said memory devices are Rambus dynamic random access memory (RDRAM) devices and wherein said memory interface further comprises:
dual read buffers; and
a page hit detection controller for determining which cycles are accessing open pages of memory.

7. The memory system of claim 1, wherein said plurality of concurrently accessible memory channels is two or more.

8. A computer system, comprising:
a processor having a cache;
a plurality of input/output devices, wherein one of said input/output devices is a mass storage subsystem;
a plurality of bus masters, each bus master coupled to one of said input/output devices;
a plurality of memory devices; and
a memory controller coupled to said plurality of memory devices, said memory controller coupled between said processor and said plurality of bus masters, including:
at least one bus interface, said bus interface for communicating data between said input/output device and said memory devices;
a processor interface for communicating data between said processor and said memory devices, including:
a central snoop arbiter for receiving snoop requests from a plurality of sources to snoop the processor cache, said central snoop arbiter determining priority among the snoop requests received and granting highest priority to one of the snoop requests; and
a memory interface, including:
a plurality of concurrently accessible memory channels, each memory channel communicating with a corresponding one of the plurality of memory devices, each memory channel corresponding to a unique address range, each memory channel being independently coupled to said processor interface and said at least one bus interface, each said memory channel including:
a snoop controller for generating a snoop request to the processor cache and receiving a snoop acknowledge; and
an arbiter receiving memory access requests from said processor and said at least one bus master.

9. The computer system of claim 8, wherein said computer system receives memory cycles from said processor and said at least one bus master, the computer system further comprising:
a memory mapper receiving said memory cycles for determining which memory channel the cycle should be directed to.

10. The computer system of claim 8, wherein each memory channel includes a write posting buffer, each write post buffer being independently completed.

11. The computer system of claim 8, wherein said arbiter is configurable to grant highest priority to a particular requestor.

12. The computer system of claim 8, wherein said processor is capable of issuing lock cycles and wherein if said processor issues a locked cycle to one of said memory channels said one memory channel is locked and the remaining memory channels are not locked.

13. The computer system of claim 8, wherein said memory devices are Rambus dynamic random access memory (RDRAM) devices and wherein said memory interface further comprises:
dual read buffers; and
a page hit detection controller for determining which cycles are accessing open pages of memory.

14. The computer system of claim 8, wherein said plurality of concurrently accessible memory channels is two or more.

* * * * *